(12) United States Patent
Kies et al.

(10) Patent No.: US 8,943,164 B2
(45) Date of Patent: Jan. 27, 2015

(54) APPARATUS AND METHODS FOR RETRIEVING/ DOWNLOADING CONTENT ON A COMMUNICATION DEVICE

(75) Inventors: Jonathan K. Kies, Encinitas, CA (US); Mazen Chmaytelli, San Diego, CA (US); Steven R. Altman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 666 days.

(21) Appl. No.: 11/963,895

(22) Filed: Dec. 24, 2007

(65) Prior Publication Data

US 2009/0164602 A1 Jun. 25, 2009

(51) Int. Cl.
| | | |
|---|---|---|
| G06F 15/16 | (2006.01) | |
| G06F 15/177 | (2006.01) | |
| H04L 29/08 | (2006.01) | |

(52) U.S. Cl.
CPC ............ H04L 67/2828 (2013.01); H04L 67/28 (2013.01)
USPC ........... 709/217; 709/218; 709/219; 709/220; 709/221; 709/222

(58) Field of Classification Search
CPC .................................................. H04L 29/0809
USPC .......................... 709/217, 216, 215, 218, 219
See application file for complete search history.

(56) References Cited

U.S. PATENT DOCUMENTS

| | | | | |
|---|---|---|---|---|
| 6,011,537 | A * | 1/2000 | Slotznick ........................ | 715/733 |
| 6,947,973 | B2 | 9/2005 | Shimura et al. | |
| 2001/0003194 | A1* | 6/2001 | Shimura et al. ............... | 709/310 |
| 2003/0236917 | A1 | 12/2003 | Gibbs et al. | |
| 2006/0031511 | A1* | 2/2006 | Salt ................................ | 709/227 |
| 2006/0106658 | A1* | 5/2006 | Johanson et al. ................ | 705/7 |
| 2006/0242269 | A1* | 10/2006 | Gross ............................. | 709/219 |
| 2006/0290688 | A1 | 12/2006 | Chae et al. | |
| 2007/0214278 | A1 | 9/2007 | Kim et al. | |
| 2007/0288855 | A1* | 12/2007 | Rohrabaugh et al. ......... | 715/760 |
| 2008/0231642 | A1 | 9/2008 | Okita | |

FOREIGN PATENT DOCUMENTS

| | | |
|---|---|---|
| CN | 1798392 A | 7/2006 |
| CN | 1849789 A | 10/2006 |

(Continued)

OTHER PUBLICATIONS

International Search Report and Written Opinion—PCT/US2008/087995, International Search Authority—European Patent Office—May 14, 2009.

(Continued)

*Primary Examiner* — Noel Beharry
*Assistant Examiner* — Abdelnabi Musa
(74) *Attorney, Agent, or Firm* — Shirin Tefagh

(57) ABSTRACT

Apparatus, methods, processors, and computer readable media for receiving or transmitting content based on a presentation area size of a communication device are provided. In one aspect, the method includes obtaining a presentation area size of a display on a first communication device, and obtaining a first portion of content from a second communication device located across a communications network. The first portion of content is based on the presentation area size. The method further includes storing the first portion of content in a memory of the first communication device.

70 Claims, 6 Drawing Sheets

(56) References Cited

FOREIGN PATENT DOCUMENTS

| | | | |
|---|---|---|---|
| EP | 1291777 | A1 | 3/2003 |
| EP | 1852786 | A1 | 11/2007 |
| JP | 9305473 | A | 11/1997 |
| JP | 2000148573 | A | 5/2000 |
| JP | 2001357008 | A | 12/2001 |
| JP | 2003208380 | A | 7/2003 |
| JP | 2005182166 | A | 7/2005 |
| KR | 20070000652 | A | 1/2007 |
| WO | 2006046286 | A1 | 5/2006 |

OTHER PUBLICATIONS

European Search Report—EP08102956—Search Authority—Munich—May 4, 2009.

* cited by examiner

APPARATUS AND METHODS FOR RETRIEVING/DOWNLOADING CONTENT ON A COMMUNICATION DEVICE

BACKGROUND

The described aspects relate to wireless communication devices, and more particularly, to retrieving and downloading content onto a wireless communication device.

Communication devices are increasingly being used to retrieve and view content located across communications networks on devices such as servers. For instance, the user may traverse a large hierarchical menu structure on the server in order to get to the content of interest to the user. Further, the menu structure being traversed can be large relative to the capacity of the communication device retrieving the menu structure. As a result, the user may need to wait while the menu structure is retrieved from the server. With many users' expectation of instant access to information, the wait may frustrate the user.

The user may further need to wait for content from a server when supplemental information is associated with items of the content. For example, an application that may use a hierarchical menu structure could be a sales application with the items of the menu structure being goods for sale, such as video games, ringtones, etc. Further, for example, the video game may include supplemental information such as an image or short animation, while the ringtone may include supplemental information such as a sample of the ringtone. Although this supplemental information may increase the likelihood of the product being purchased, the user may have to wait for the supplemental information to be retrieved from the server, potentially causing delay and leading to a poor user experience. Additionally, communication devices have relatively small displays, making it frustrating for the user to view supplemental information associated with an item of a menu or product, e.g. an image of a video game. As such, a laborious manipulation of the device may be required in order to see the full screen shot or additional screen shots.

Accordingly, it would be advantageous to provide an apparatus and method that provides an enhanced user experience when viewing menu structures and supplemental information associated with menu items of the menu structure.

SUMMARY

The described aspect provide apparatus, methods, processors and computer program products for obtaining and/or transmitting content based on the presentation area of a device requesting content.

In an aspect, a communication device is provided. The communication device comprises a processor, an output device, a memory, and a retrieval module. The output device is in communication with the processor and has a display with a presentation area size. The memory is in communication with the processor, and stores the retrieval module. The retrieval module has retrieval logic executable by the processor to generate a first content request to retrieve a first portion of content from a second communication device located across a communications network. The first portion of content is based on the presentation area size. The retrieval module is further operable to initiate storage of the first portion of content in the memory.

In another aspect, a method for retrieving content on a communication device is provided. The method includes obtaining a presentation area size of a display on a first communication device, and obtaining a first portion of content from a second communication device located across a communications network. The first portion of content is based on the presentation area size. The method further includes storing the first portion of content in a memory of the first communication device.

In still another aspect, at least one processor for retrieving content on a communication device is provided. The processor includes a first module obtaining a presentation area size of a display on a first communication device and a second module for obtaining a first portion of content from a second communication device located across a communications network. The first portion of content is based on the presentation area size. The processor further includes a third module for storing the first portion of content in a memory of the first communication device.

In still another aspect, a computer program product is provided. The computer program product comprises a computer-readable medium that includes at least one instruction for causing a computer to obtain a presentation area size of a display on a first communication device. The computer-readable medium further includes at least one instruction for causing the computer to obtain a first portion of content from a second communication device located across a communications network. The first portion of content is based on the presentation area size. Further included in the computer-readable medium is at least one instruction for causing the computer to store the first portion of content in a memory of the first communication device.

In yet another aspect, an apparatus is provided. The apparatus includes means for obtaining a presentation area size of a display on a first communication device. The apparatus further includes means for obtaining a first portion of content from a second communication device located across a communications network. The first portion of content is based on the presentation area size. Further included in the apparatus is means for storing the first portion of content in a memory of the first communication device.

In yet another aspect, a network device is provided. The network device comprises a processor and a memory in communication with the processor, where the memory comprises content. The network device further comprises a download manager module stored in the memory. The download manager module has download manager logic executable by the processor to receive a first content request from a communication device having a presentation area size and located across a communications network. The download manager logic is further executable to transmit a first portion of the content based on the first content request and the presentation area size to the communication device.

In still another aspect, a method of delivering content to a communication device is provided. The method includes receiving a first content request from a second communication device having a presentation area size and located across a communications network. The method further includes transmitting to the communication device a first portion of the content based on the first content request and the presentation area size.

In yet another aspect, at least one processor configured to deliver content to a communication device is provided. The processor includes a first module for receiving a first content request from a second communication device having a presentation area size and located across a communications network. The processor further includes a second module for transmitting to the communication device a first portion of the content based on the first content request and the presentation area size.

In still another aspect, a computer program product is provided. The computer program comprises a computer-readable medium comprising at least one instruction for causing a computer to receive a first content request from a second communication device having a presentation area size and located across a communications network. The computer-readable medium further includes at least one instruction for causing the computer to transmit to the communication device a first portion of the content based on the first content request and the presentation area size.

In yet another aspect, an apparatus is provided. The apparatus includes means for receiving a first content request from a second communication device having a presentation area size and located across a communications network. The apparatus further includes means for transmitting to the communication device a first portion of the content based on the first content request and the presentation area size.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
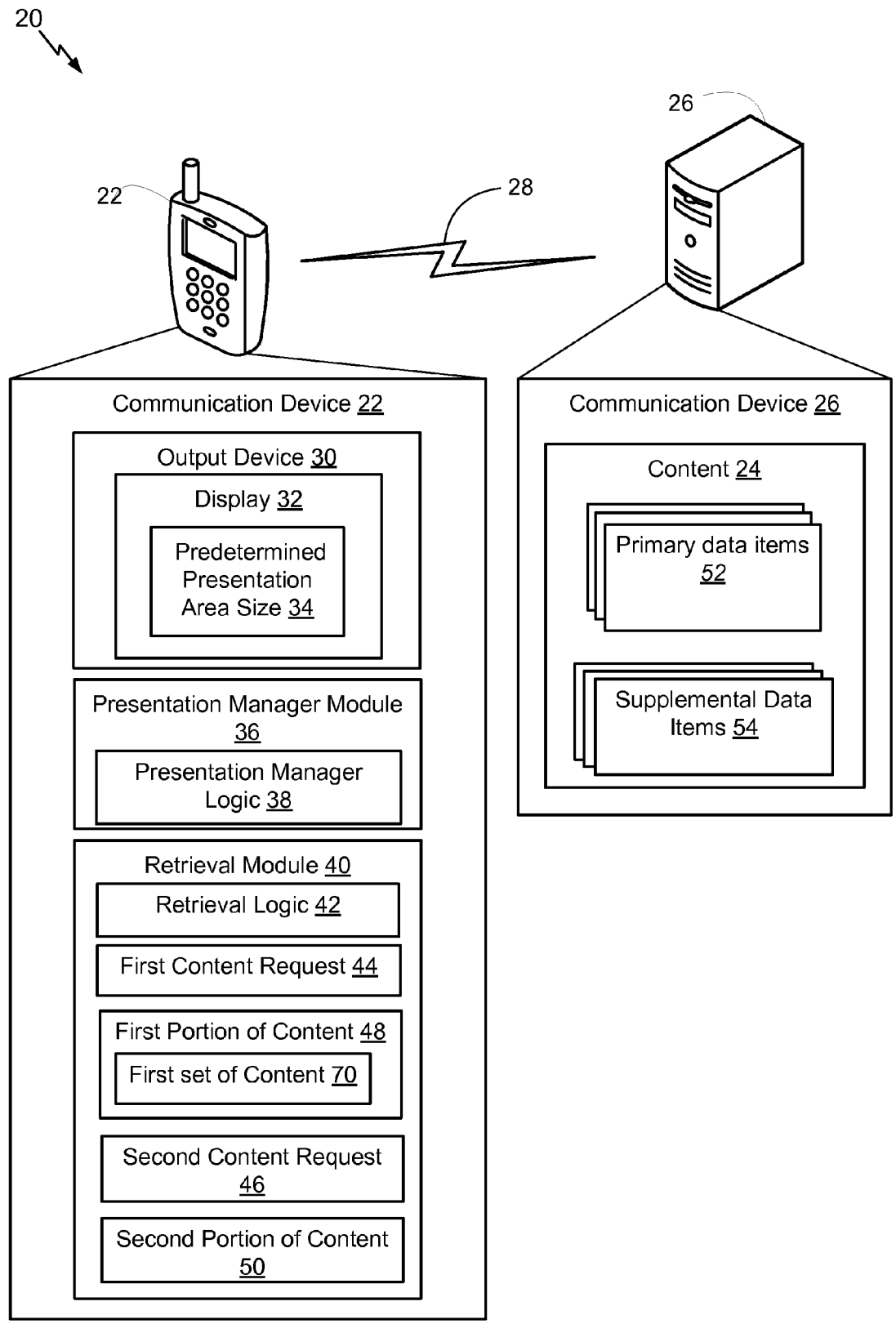
FIG. 1 is a schematic diagram of one aspect of an enhanced presentation system.

The apparatus and methods described herein provide for a first communication device, such as a cell phone, to retrieve content across a communications network from a second communication device, such as a server, in a manner that provides a user of the first device with an enhanced user experience in terms of both downloading and viewing the content. The presentation of the content may be enhanced by reducing or eliminating the time the user may have to wait for the content to be retrieved and presented. In one aspect, the presentation of the content may be enhanced by retrieving a first portion of the content in a foreground process, with a size of the first portion based on a presentation area of a display of an output device or display of a retrieving communication device. As such, in one aspect, the size of the content initially retrieved from the downloading communication device is reduced, thus reducing the time to present the content on the retrieving communication device.

Alternatively, or in addition, in another aspect, the retrieving communication device may retrieve additional portions of the content in a background process, for example, at a time before the content is needed for presentation. In one aspect, one or more additional portions of the content are retrieved in the background process, while another portion of the content previously retrieved is being presented on the output device of the retrieving communication device. For example, the one or more portions of the content retrieved in the background process may be selected based on how likely the content is to be requested by the user for presentation on the output device. By retrieving portions of the content in the background process, the initially-retrieved portions of the content sized for the display may be immediately available for presentation on the output device, thereby reducing the wait time for the user.

Alternatively, or in addition, the retrieved content may comprise primary data items, such as a list or menu of catalog items, and supplemental data items, such as additional information about the catalog items. Upon receiving a request for additional information, the retrieving communication device may provide for switching the display from a primary data item view to a supplemental data item view. The primary data item view presents primary data items with one of the data items being a currently-highlighted or selected primary data item. The supplemental data item view may present one or more supplemental data items associated with the currently-highlighted or selected primary data item. In these aspects, the portion of the content corresponding to the primary data item view is downloaded initially in a foreground process, while the portion(s) corresponding to the supplemental data item view are downloaded in a background process. In one aspect, for example, the background process optimizes content retrieval by initially retrieving only the portion of the additional information corresponding to the portion of the items in the menu or list that is viewable on the display in the current view. Thus, by conveniently optimizing content retrieval and providing additional information regarding the currently-highlighted or selected primary data item, the present apparatus and methods enhance the presentation of content.

Therefore, the present apparatus and methods operate to enhance the presentation of content on a first communication device by retrieving a portion of the content from a second communication device based on the size of the presentation area of the first communication device. The presentation of content may be further enhanced by providing a convenient method of retrieving and viewing supplemental data items associated with primary data items.

Referring to FIG. 1, one aspect of an enhanced presentation system 20 comprises a first communication device 22, such as a cell phone, operable to retrieve content 24 from a second communication device 26, such as a server, across a communications network 28. In one aspect, the content 24 may have a presentation size larger than a presentation area of the first communication device 22. For example, communication device 22 comprises an output device 30 with a display 32 having a presentation area size 34. Presentation area size 34 may comprise a number of lines and a number of characters per line, and/or an area, for example, defined by a measure of a vertical height and a horizontal width. The communication device 22 may further comprise a presentation manager 36 having presentation manager logic 38 executable to present the content on the display 32. The communication device 22 may further comprise a retrieval module 40 having retrieval logic 42 executable to generate a first content request 44 and a second content request 46. The first content request 44 requests a first portion of content 48 from the second communication device 26. The first portion of content 48 may be sized for the presentation area size 34. By sizing the first portion of content 48 by the presentation area size 34, the first portion of content 48 may be retrieved in less time than all the content 24. In other words, the first portion of content 48 corresponds to the part of the content that would be initially visible on display 32. Thus, the time a user may have to wait for the first portion of content 48 to be presented on the display 32 may be less than the time it would have taken if the full amount of the content 24 were retrieved prior to presenting the first portion of content 48.

Alternatively, or in addition, in another aspect, the communication device 22 is further operable to generate a second content request 46 to retrieve a second portion of content 50 from the second communication device 26 in a background process. The second portion of content 50 requested by the second content request 46 has not yet been requested for presentation on the display 32, for example, based on a user input to change the view or to retrieve additional information. As such, the second portion of content 50 may be retrieved while the user consumes the first portion of content 48. By retrieving the content 24 that is not yet requested for presentation on the display 32, the present aspect may reduce the wait time experienced by a user when changing views or requesting additional information.

Figure 2:
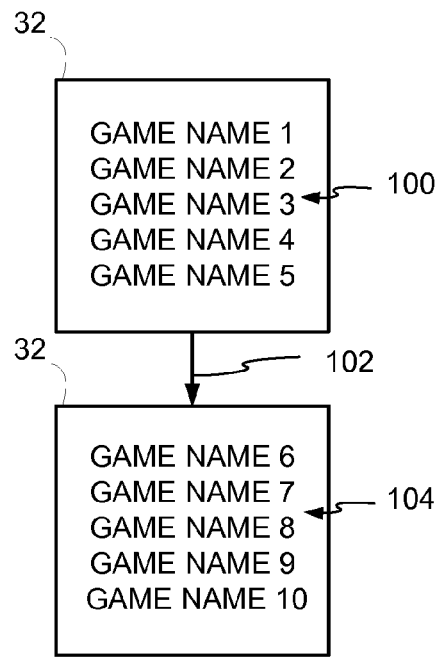
FIG. 2 is an illustration of two screens that may be displayed on the communication device of FIG. 1, according to one aspect.

Referring to FIGS. 1 and 2, in one non-limiting aspect, for example, the communication device 22 retrieves portions of a catalog of games for sale from a retailer. The presentation area size 34 is not large enough to present all the games in the catalog, so in the present aspect, the retrieval module 40 generates a first content request 44 requesting a first portion of content 48 sized to fit the presentation area size 34. While waiting for first portion of content 48 to be downloaded, the communication device 22 may present an indicator, such as an hourglass, etc., that the content 24 is being retrieved. In this example, the first portion of content 48 retrieved from the second communication device 26 is depicted as view 100, with the display 32 presenting "GAME NAME 1" through "GAME NAME 5". By only retrieving the first portion of content 48 based on the presentation area size 34, the user of the communication device 22 may not have to wait as long for the content 24 to be presented when compared to retrieving the full catalog. Further, retrieving the chunk of items associated with the first portion of content 48 provides an enhanced user experience as opposed to waiting for all of the items, or as opposed to performing a retrieval item-by-item. Depicted as view 104 is the display 32 after a page down or scroll down request 102 is received from the user, where the additional portion of the content 24, e.g. "GAME NAME 6" though "GAME NAME 10", is presented on the display 32. Alternatively, or in addition, in one implementation, the communication device 22 may generate a second content request 46 for retrieving content 24 in a background process from the second communication device 26 before the content 24 is requested for presentation. In the example presented in FIG. 2, some or all of the content 24 presented in view 104 may have been retrieved before being requested for presentation.

Figure 3:
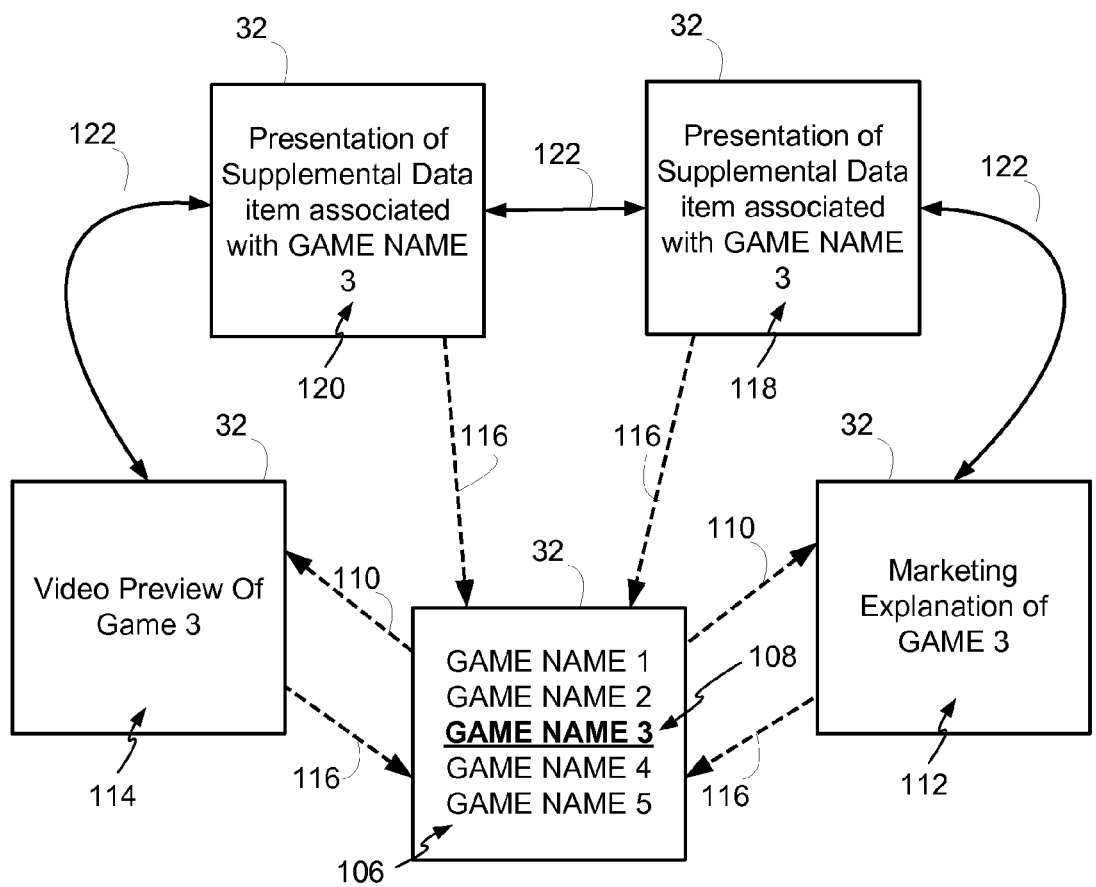
FIG. 3 is an illustration of the presentation of information on the display of the communication device of FIG. 1, where one display illustrates the presentation of primary data items and the other displays illustrate the presentation of secondary data items associated with a current primary data item, in accordance with one aspect.

Further, referring to FIGS. 1 and 3, in one non-limiting aspect, for example, the content 24 may be divided into primary data items 52 and supplemental data items 54, where each supplemental data item 54 is associated with at least one primary data item 52 and may provide additional information for the primary data item 52. Depicted as view 106, the presentation manager logic 38 presents a portion of a catalog of games for sale on the display 32. One of the games, GAME NAME 3, is a currently-highlighted or selected game 108. Upon receiving an additional information request 110 from a user, the presentation manager logic 38 is executable to present one or more supplemental data items 54 (FIG. 1) of the content 24 (FIG. 1) associated with the currently-highlighted or selected game 108. The presentation manager logic 38 may be executable to present one view for each supplemental data item 54 associated with the current game 108, or multiple supplemental data items may be combined in a single view. For example, the presentation logic 38 may be executable to respond to a supplemental content request 110, which may be a scroll left or scroll right key press from a user of the communication device 22. Further, presentation logic 38 may be executable to respond to an additional supplemental content request 122, which may be a scroll left or scroll right key press from a user of the communication device 22 from a secondary view. Depicted in views 112, 114, 118, and 120 (FIG. 3) are supplemental data items 54 (FIG. 1) associated with the currently-highlighted or selected game 108 being presented on the display 32 in the initial view 106. For example, view 112 is a textually-based marketing message for the user to read. View 114 may include a static graphic, an animation, and/or a video preview of the video game for the user to review. Views 118 and 120 are additional supplemental information for the currently-highlighted or selected game 108. As an example, the supplemental information 54 presented in views 112, 114, 118, 120 may make it more likely that the user purchase the current game 108, and may provide value to the user experience by making it easier for the user to understand the currently-highlighted or selected game 108. Upon receiving a return request 116, the presentation manager logic 38 is executable to return to the display 32 to the initial view 106, where the primary data items 52 are being presented. The return request 116 may be a key press by the user, or may be a time out received from a system process of the communication device 22.

Thus, system 20 provides apparatus and methods for enhancing the presentation of the content 24 by retrieving a first portion of content 48 in the foreground process based on the presentation area 34, and alternatively, or in addition, by retrieving additional portions of the content 24 in the background process in cases where the additional portions of the content 24 are not currently needed for presentation on the display 32. Therefore, system 20 adds value to the user experience in that the user may not have to wait as long for the presentation of the first portion of the content 24, as compared to the case where the entirety of the content 24 is retrieved prior to the presentation of the respective first portion. Additionally, system 20 may enhance the user experience by retrieving the additional portions of the content 24 during presentation of the first portion of content. As such, system 20 retrieves the additional portion of the content 24 before the additional portion of the content 24 has been requested for presentation, enabling the additional portions of the content 24 to be available for presentation without the user having to wait for retrieval. Additionally, the presentation of the content 24 is further enhanced by providing a convenient method of viewing supplemental data item 54 associated with primary data items 52, e.g. by allowing a user to quickly glance at various views of supplemental information.

According to one aspect, first communication device 22 and second communication device 26 may comprise any type of computerized, communication device. For example, as illustrated in FIG. 1, first communication device 22 may comprise a mobile communication device, such as a wireless and/or cellular telephone, while second communication device 26 may comprises a fixed communication device, such as a network device, a server, a computer workstation, etc. It should be understood that communication devices 22 and/or 26 are not limited to the illustrated devices, but may further include a Personal Digital Assistant (PDA), a two-way text pager, a portable computer having a wired or wireless communication portal, and any type of computer platform having a wired and/or wireless communications portal. Further, second communication device 26 can be a remote-slave or other similar device, such as remote sensors, remote servers, diagnostic tools, data relays, and the like, which does not have an end-user thereof, but which simply communicates data across a wireless or wired network. In an alternate aspect, first communication device 22 and/or second communication device 26 may be a wired communication device, such as a landline telephone, personal computer, set-top box, or the like. Additionally, it should be noted that any combination of any number of first communication device 22 and/or second communication device 26 may be utilized in system 20. Therefore, the present apparatus and methods can accordingly be performed on any form of wired or wireless device or computer module, including a wired or wireless communication portal, including without limitation, wireless modems, PCMCIA cards, access terminals, personal computers, telephones, or any combination or sub-combination thereof.

Figure 4:
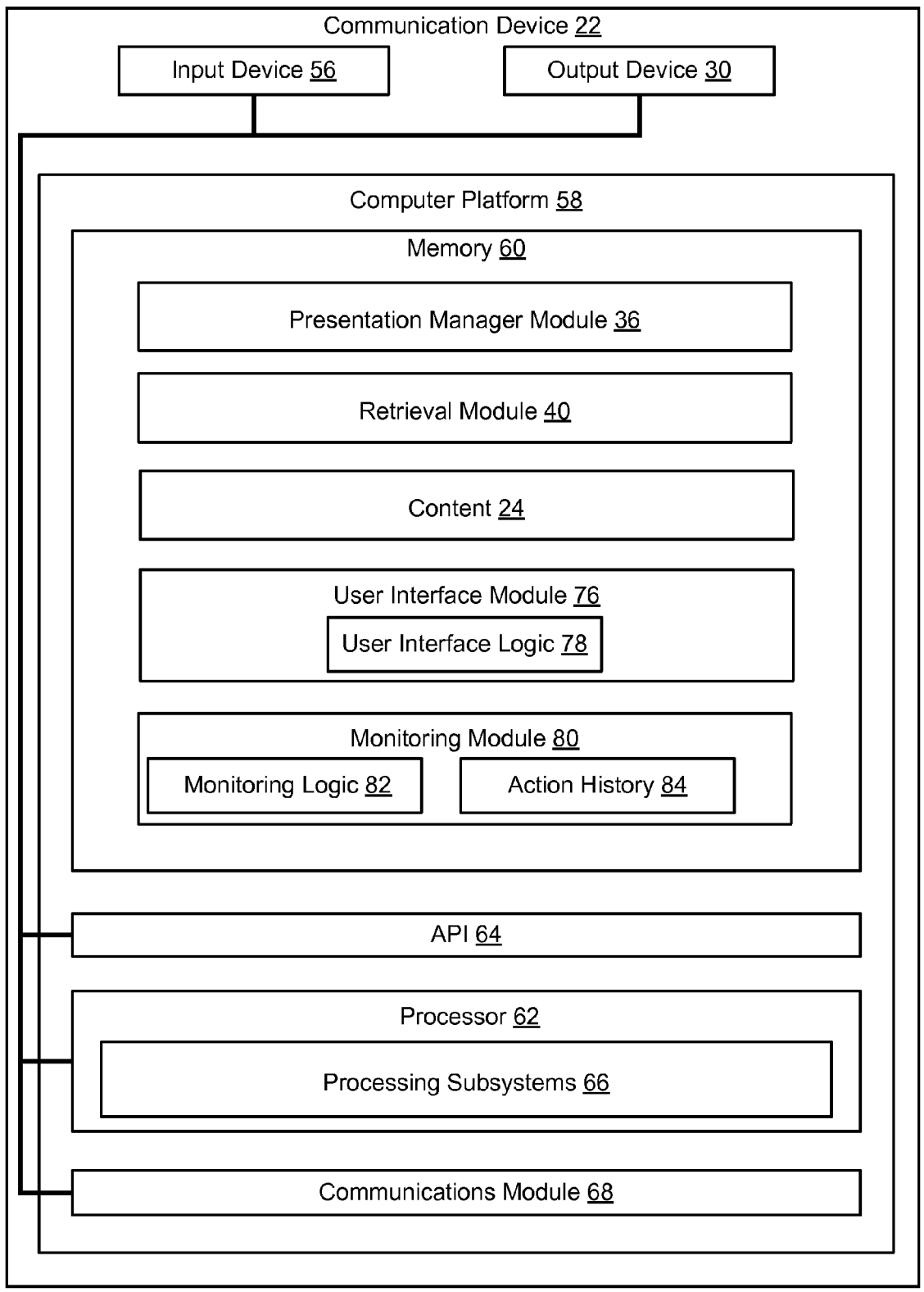
FIG. 4 is a schematic diagram of one aspect of components of the communication devices of the system of FIG. 1.

Additionally, referring to FIG. 4 (which, for simplicity, references first communication device 22), first communication device 22 and/or second communication device 26 may include an input device 56 operable to generate or receive an input into the device, and an output device 30 operable to generate and/or present information for consumption by the user of the device. For example, input device 56 may include at least one device such as a keypad and/or keyboard, a mouse, a touch-screen display, a microphone in association with a voice recognition module, etc. In one implementation, input device 56 may provide for user input of a request for content or for user input of a request for additional information. Further, for example, output device 30 may include a display 32 (FIG. 1), an audio speaker, a haptic feedback mechanism, etc. Output device 30 may generate a graphical user interface, a sound, a feeling such as a vibration, etc., and such outputs may be associated, for example, with the presentation of the content 24 (FIG. 1).

Further, communication device 22 may include a computer platform 58 operable to execute applications to provide functionality to the device, and which may further interact with input device 56 and output device 30. Computer platform 58 may include a memory 60, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 60 may include active memory and storage memory, including an electronic file system and any secondary and/or tertiary storage device, such as magnetic media, optical media, tape, soft and/or hard disk, and removable memory components.

Further, computer platform 58 may also include a processor 62, which may be an application-specific integrated circuit (ASIC), or other chipset, processor, logic circuit, or other data processing device. In one aspect, such as when communication device 22 comprises a cellular telephone, processor 62 or other logic such as ASIC may execute an application programming interface (API) layer 64 that interfaces with any resident software components, such as voice call, data call, and media-related applications in memory 60. API 64 may be a runtime environment executing on the respective communication device. One such runtime environment is Binary Runtime Environment for Wireless® (BREW®) software developed by Qualcomm Incorporated of San Diego, Calif. Other runtime environments may be utilized that, for example, operate to control the execution of applications on wireless computing devices.

Additionally, processor 62 may include various processing subsystems 66 embodied in hardware, firmware, software, and combinations thereof, that enable the functionality of communication device 22 and the operability of the communication device on communications network 28 (FIG. 1). For example, processing subsystems 66 allow for initiating and maintaining communications, and exchanging data, with other networked devices as well as within and/or among components of communication device 22. In one aspect, such as in a cellular telephone, processor 62 may include one or a combination of processing subsystems 66, such as sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 66 of processor 62 may include any subsystem components that interact with applications executing on computer platform 58.

Computer platform 58 may further include a communications module 68 which enables communications among the various components of communication device 22. The Computer platform 58 is further operable to exchange the content 24 (FIG. 1) and content requests between the communication device 22 and communications network 28 (FIG. 1). Communications module 68 may be embodied in hardware, firmware, software, and/or combinations thereof, and may further include all protocols for use in intra-device and inter-device communications. Further, communications module 68 is operable to transmit and/or receive information, such as first content request 44 (FIG. 1) and first portion of content 48 (FIG. 1), in accordance with one aspect of the apparatus and methods described herein.

Additionally, referring to FIGS. 1 and 4, in one implementation, memory 60 (FIG. 4) may further store the content 24. The content 24 may comprise primary data items 52 (FIG. 1) and supplemental data items 54 (FIG. 1), where each supplemental data item 54 is associated with at least one primary data item 52. For example, the primary data items 52 could be a list of items from a catalog and supplemental data items 54 could be supplemental information regarding the primary data items 52, such as pictures of the catalog items, audio clips, video, static graphics, etc. In one aspect, the content 24 may be organized so that the primary data items 52 are substantially smaller in size than the supplemental data items 54. For example, the primary data items 52 could be text of the names of video games, with perhaps small graphic files for a logo, and a supplemental data item 54 associated with the primary data item 52 may be a video file demonstrating the game or a screen shot of the video game. In another aspect, the content 24 may be an ordered set, so that a content request may identify additional portions of the content 24 relative to some currently-highlighted or selected content previously retrieved. For example, the content 24 could be a catalog with a list of items, such as video games, and the video games could be ordered in a list beginning with the most popular and ending with the least popular. Further, in some aspects, the content 24 may comprise a hierarchy having one or more levels of content, where the levels of the hierarchy define primary data items 52 and supplemental data items 54. Additionally, for example, the content 24 may comprise text, video, graphics, or animation, and in general, the content 24 may be any data that may be stored on a communication device 26 and transmitted to a communication device 22 across a communications network 28.

Figure 5:
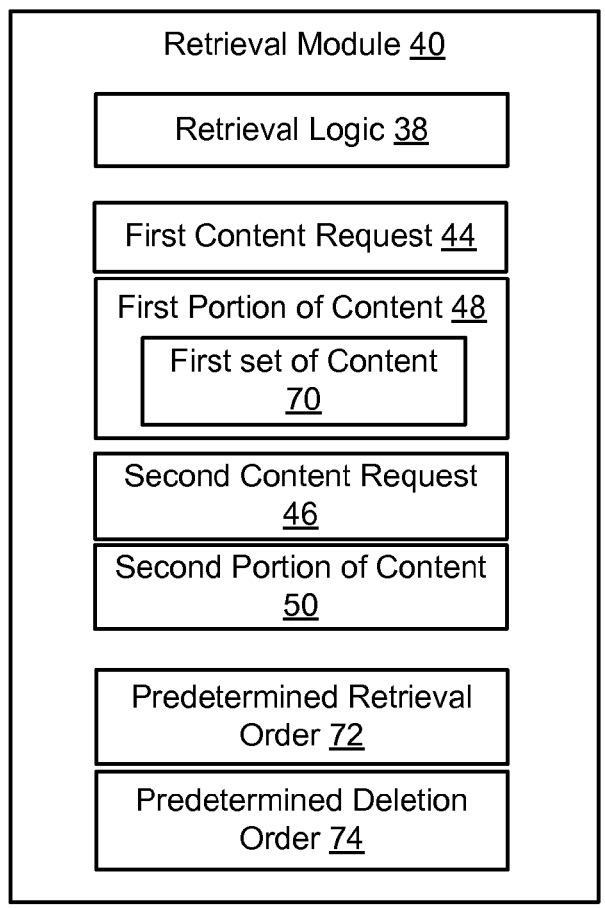
FIG. 5 is a schematic diagram of one aspect of components of a retrieval module portion of the communication devices of FIGS. 1 and 4.

Additionally, referring to FIGS. 1, 4 and 5, in one aspect, memory 60 of communication device 22 may further store retrieval module 40 operable to retrieve the content 24 across the communications network 28 from the communication device 26 in the background or foreground process. Retrieval module 40 may comprise one or any combination of hardware, software, firmware, data, and executable instructions operable to perform these functions. For example, in one implementation, retrieval module 40 may comprise retrieval logic 42 executable by the processor 62 to generate a first content request 44 and a second content request 46, where the first content request 44 and the second content request 46 identify content on communication device 26. In general, the retrieval logic 42 may be executable to generate requests for the content 24 located across the communications network 28. The retrieval logic 42 may be further executable to transfer the first content request 44 and the second content request 46 to the communications module 68 for transmission to the server, or communication device 26. In one aspect, the retrieval logic 42 is further executable to receive the content 24 requested from the server, or communication device 26, and store the retrieved content 24 in memory 60.

In some aspects, the retrieval logic 42 may be further executable to request that a size of the content in the first content request 44 be based on the presentation area size 34. For example, with the content 24 comprising primary data items 52 and supplemental data items 54 associated with the primary data items 52, the first content request 44 may comprise only the first set of content 70 corresponding to the primary data items 52 that may be presented in a single view on the display 32. The first content request 44 may further comprise a request for those supplemental data items 54 associated with the first set of content 70. In so defining the size of the requested content in the first content request 44, the time to retrieve the content 24 may be lessened when compared to other methodologies. In one implementation, the first content request 44 may request more primary data items 52 than can be presented on the display 32, such as all of the primary data items 52, and only those supplemental data items 54 corresponding to the primary data items 52 presentable in the initial view on the display 32. In requesting primary data items 52 that are not in the initial view on the display, the time for a user to wait for an additional screen of initially non-presented primary data items 52 may be lessened. Additionally, by requesting, for example, an entire level of a hierarchy of the content 24 in the first content request 44, the overhead costs of retrieving the content 24 may be lessened.

Further, in one aspect, the retrieval logic 42 may be further executable to retrieve the content 24 identified in the first content request 44 in a foreground process, while retrieving additional portions of the content 24 in one or more background processes. For example, in another aspect, the retrieval logic 42 may be executable to generate the second content request 46 for the additional portions of the content 24 that are not currently viewable on the display 32, and/or that are not currently being requested for presentation. As noted above, the content 24 identified in the second content request 46, e.g. the second portion of content 50, may be retrieved in a background process. During this background process, the communication device 22 may be presenting the content 24 identified in the first content request 44.

The retrieval logic 42 may be further executable to transfer to the second communication device 26 the presentation area size 34 and to retrieve, in either a foreground or background process, portions of the content 24 from the second communication device 26 based on the transferred presentation area size 34. The retrieval logic 42 may be further executable to transfer user input received from the input device 56 to the second communication device 26, and receive the content 24 based on the transferred presentation area size 34 and the transferred user input. For example, the second communication device 26 may transmit to the communication device 22 the first portion of content 48 sized by the presentation area size 34. Further, the second communication device 26 may then transmit the second portion of content 50 based on receiving a scroll down request, or an additional content request based on a received user scroll down, from the communication device 22. As with the first portion of content 48, the second portion of content 50 may be sized by the presentation area size 34.

The retrieval logic 42 may be further executable to retrieve the content 24 not yet in view, and/or not yet requested for presentation, based on a predetermined retrieval order 72. For example, for a catalog of primary data items 52, the retrieval logic 42 may retrieve supplemental items 54 associated with primary data items 52 that are most likely to be purchased, even though the primary data items 52 have not yet been requested for presentation. In another aspect, predetermined retrieval order 72 may request that the download server transmit an ordered list of supplemental data items 54 prioritized according to the number of requests for the respective supplemental data item. In other words, a download priority can be established based on how often the respective data item is requested. The retrieval logic 42 may be executable to retrieve the content 24 in any order from the second communication device 26 based on the predetermined retrieval order 72. According to one implementation, parameters that may be utilized to determine an order of data items in a list can include item popularity, item cost, user preferences, item rating, a marketing or sales parameter corresponding to a placement value or a placement payment or an item profit margin, etc. Further, the retrieval logic 42 may be further executable to retrieve the content 24 based on whether the content 24 has associated supplemental data items 54. For example, the retrieval logic 42 may retrieve an entire hierarchical level of the content 24 if the level does not have associated supplemental data items 54.

The retrieval logic 42 may be further executable to delete the content 24 from the memory 60 of the communication device 22 based on a predetermined deletion order 74. Deletion of the content 24 may be desired in order to free the limited resource of memory 60. The predetermined deletion order 74 may be based on whether the content 24 has been presented. The predetermined deletion order 74 may be based on deleting the larger supplemental data items 54 before the primary data items 52. The predetermined deletion order 74 may be based on a strategy to lessen the probability that the content 24 deleted from memory 60 will be requested again for presentation, and thus will have to be retrieved again from the second communication device 26.

Thus, the retrieval logic 42 is executable to retrieve the content 24 from second communication device 26 across the communications network 28, store the content 24 in memory 60, and delete the content 24 from memory 60, in order to enhance the presentation of the content 24 for the user.

Additionally, referring to FIGS. 1 and 4, in one aspect, memory 60 of communication device 22 may further store presentation manager module 36 operable to present the content 24 stored in memory 60. Presentation manager module 36 may comprise one or any combination of hardware, software, firmware, data, and executable instructions operable to perform these functions. For example, in implementation, presentation manager module 36 may comprise presentation manager logic 38 executable to present the content 24 on the display 32 of the communication device 22. In another aspect, the content 24 may be presented by using other modalities made available by the output device 30, such as sound or vibrations. Thus, the presentation manager logic 38 is operable to retrieve the content 24 from memory 60 and present the content 24 on the output device 30 of the communication device 22.

Referring to FIG. 4, in one implementation, memory 60 may further store user interface module 76 operable to allow the device user to interface with presentation manager module 36 and retrieval module 40, and any other component of the communication device 22 generating a user output and/or requiring a user input. User interface module 76 may comprise one or any combination of hardware, software, firmware, data, and executable instructions operable to perform these functions. For example, in another implementation, user interface module 76 may comprise user interface logic 78 operable to interface between output device 30 and presentation manager module 36 in order to present outputs, such as a graphical menu, a sound, the content 24, etc., to the user of the respective device, and in order to prompt the user to enter inputs, such as a scroll request, a present additional information request, a select current item request, etc.

Additionally, referring to FIG. 4, in one aspect, memory 60 of communication device 22 may further comprise monitoring module 80 operable to store actions of the communication device 22. Monitoring module 80 may comprise one or any combination of hardware, software, firmware, data, and executable instructions operable to perform these functions. For example, in another aspect, monitoring module 80 may comprise monitoring logic 82 operable to store the actions of the communication device 22 in an action history 84. The actions of the communication device 22 include data that tracks the use of hardware and software on the device, received inputs from the user, such as a scroll down request, a scroll up request, an item selection, a request for additional information, and in general any action occurring on the communication device 22 may be recorded in the action history 84. The action history 84 may be stored on the communication device 22 in memory 60, and the action history 84 may be transmitted to another communication device across the communications network 28 for analysis. Thus, the monitor module 80 provides the communication device 22 with the ability to store information relating to a history of the actions occurring on the communication device 22.

Figure 6:
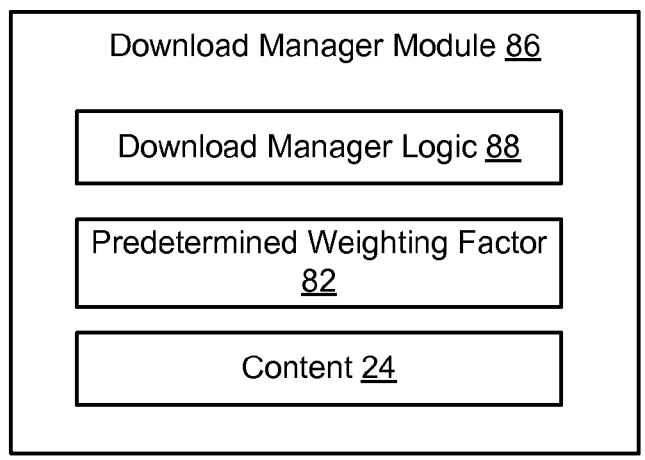
FIG. 6 is a schematic diagram of one aspect of components of a download manager module of the communication device of FIG. 1.

Additionally, referring to FIGS. 1 and 6, in one aspect, memory 60 (FIG. 4) of second communication device 26 may further store download manager module 86 operable to respond to requests for the content 24 by transmitting the content 24 across communications network 28 to the requesting communication device 22. Download manager module 86 may comprise one or any combination of hardware, software, firmware, data, and executable instructions operable to perform these functions. For example, in another aspect, download manager module 86 may comprise download manager logic 88 executable by the processor 62 to receive first content request 44 and second content request 46, where the first content request 44 and the second content request 46 identify or correspond to portions of content 24 on the communication device 26. In general, the download manager logic 86 may be executable to respond to requests for content 24 by transmitting the content 24 across a communications network 28 to the communication device 22.

In one implementation, the download manager logic 86 may be further executable to receive from communication device 22 the presentation area size 34 and to transmit the content 24 to the communication device 22 based on the presentation area size 34, and/or based on user input received from the communication device 22. For example, the download manager logic 88 may transmit to the communication device 22 a first portion of content 48 sized based on the presentation area size 34. Thereafter, the download manager logic 88 may automatically send additional portions of the content 24, such as second portion of content 50, based on presentation area size 34 and/or based on some other factor, such as the second portion of content 50 being the supplemental data items 54 corresponding to the first portion of content 48 or being a portion of the content 24 at the same hierarchical level as first portion of content 48, but being outside of the initial view. For example, in one aspect, download manager logic 88 may download a menu or list of a plurality of primary data items, and then in the same download or in next respective communication, download respective ones of the supplemental data items corresponding to the portion of the primary data items that are initially viewable on the display based on presentation area size 34. In another aspect, the download manager logic 86 may transmit second portion of content 50 based on second content request 46, such as based on a scroll request or an item selection or a glance request received by the communication device 22. Further, the download manager logic 86 may size the second portion of content 50 by the presentation area size 34. Additionally, as mentioned above, download manager logic 86 may send portions of the content 24 based on some predetermined order of retrieval 72, which may be defined by second communication device 26, or first communication device 22, or the user of either device.

In one implementation, the content 24 may comprise an ordered set of data items, for example, having a predetermined weighting factor 90. The order of the data items, e.g. the predetermined weighting factor 90, may be used by download manager logic 88 to determine an order in which to download data items of requested content 24. Predetermined weighting factor 90 may be based on a factor such as, but not limited to, a number of downloads, a frequency of screen views, a device user preference, a content provider preference, a pay-for-placement scheme, a quality rating, a profit margin, a cost, or any combination thereof. For example, the first portion of content 48 may comprise a menu of a plurality of games, such as in FIG. 2, where the order in which the games are listed may depend on the predetermined weighting factor 90. Additionally, it should be noted that predetermined weighting factor 90 may be applied to one or both of primary data items and secondary data items. In one aspect, predetermined weighting factor 90 may be based on aggregate user behavior which may be collected from monitoring module (FIG. 4) and forwarded to download manager module 86.

Thus the download manager logic 88 is executable to transmit the content 24 to a communication device 22 based on received user input and/or a received presentation area size 34 and/or a predetermined weighting factor 90.

Referring back to FIG. 1, communications network 28 may comprise any data and/or voice communications network. For example, communications network 28 may comprise all or some portion of any one or any combination of: a wired or wireless telephone network; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.xx network; a packet data network; a data network; an Internet Protocol (IP) Multimedia Subsystem (IMS) network; a public switched telephone network; a public heterogeneous communications network, such as the Internet; a private communications network; a multicast network such as a Forward Link Only (FLO) network, including the MediaFLOT System available from Qualcomm Incorporated of San Diego, Calif.; a digital video broadcasting (DVB) network, such as DVB-S for satellite, DVB-C for cable, DVB-T for terrestrial television, DVB-H for terrestrial television for handhelds; and a land mobile radio network.

Further, examples of telephone networks that may be included in one or more aspects of communications network 28 include at least a portion of one, or any combination, of analog and digital networks/technologies, such as code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed packet access (HSPA), analog and digital satellite systems, and any other technologies/protocols that may be used in a wireless communications network or a data communications network, or a combination thereof.

Figure 7:
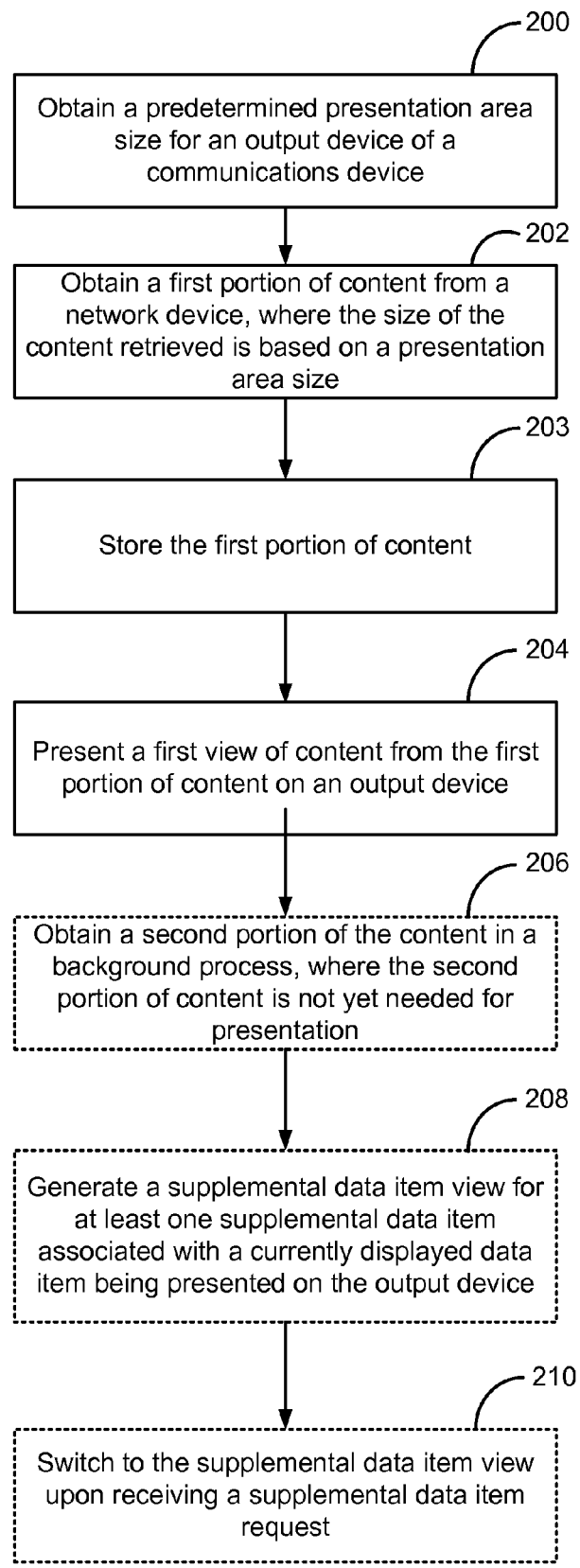
FIG. 7 is a flowchart of one aspect of a method for enhanced presentation operable on the communication device retrieving content.

Referring to FIG. 7, in operation, one non-limiting implementation of a method for enhanced presentation of the content on a communication device comprises obtaining a presentation area size for an output device of a communication device (Block 200). For example, in one non-limiting aspect, referring to FIG. 1, communication device 22 may obtain the presentation area size 34 of the display 32.

The method may further include obtaining the first portion of content 48 from a network device, where the size of the content retrieved is based on the presentation area size (Block 202). For example, in one non-limiting aspect, referring to FIG. 1 retrieval module 40 may generate the first content request 44 to request the first portion of content 48 where the size of the first portion of content 48 is based on the presentation area size 34. By basing the size of the first content request 44 on the presentation area size 34, the time to retrieve the first portion of content 48 may be lessened.

Further, the method includes storing the first portion of content in a memory on the communication device (Block 203). For example, first portion of content 48 can be stored in memory 60 of communication device 22.

The method may further include presenting a first view of the content from the first portion of content 48 on the output device 30 (Block 204). For example, in one non-limiting aspect, referring to FIG. 1, presentation manager module 36 may present on display 32 the first set of content 70 from the first portion of content 48 retrieved from network device 26. For example, the first set of content 70 may comprise all, or only a viewable portion, of the primary data items from the first portion of content 48.

Optionally, the method may further include obtaining the second portion of content 50 in a background process, where the second portion of content 50 is not yet needed for presentation (Block 206). For example, in one non-limiting aspect, referring to FIG. 1, retrieval module 40 may generate the second content request 46 for the second portion of content 50 from the network device 26. The generation of the second content request 46 and the retrieval of the second portion of content 50 may be performed while the display 32 is presenting the first set of content 70 for the user.

Optionally, the method may further include generating a supplemental data item view for at least one supplemental data item 54 associated with the currently-highlighted/selected or currently-viewable primary data item 52 being presented on the output device (Block 208). For example, in one non-limiting implementation, referring to FIGS. 1 and 3, presentation manager module 36 generates views 114 and 112 for supplemental data items 54 associated with the primary data item 52, e.g. "GAME NAME 3" in the subject aspect.

Optionally, the method may further include switching to a supplemental data item view upon receiving a present supplemental data item request (Block 210). For example, in one non-limiting implementation, referring to FIGS. 1 and 3, the presentation manager module 36 may switch to view 112 upon receiving a scroll right key press from the user.

Figure 8:
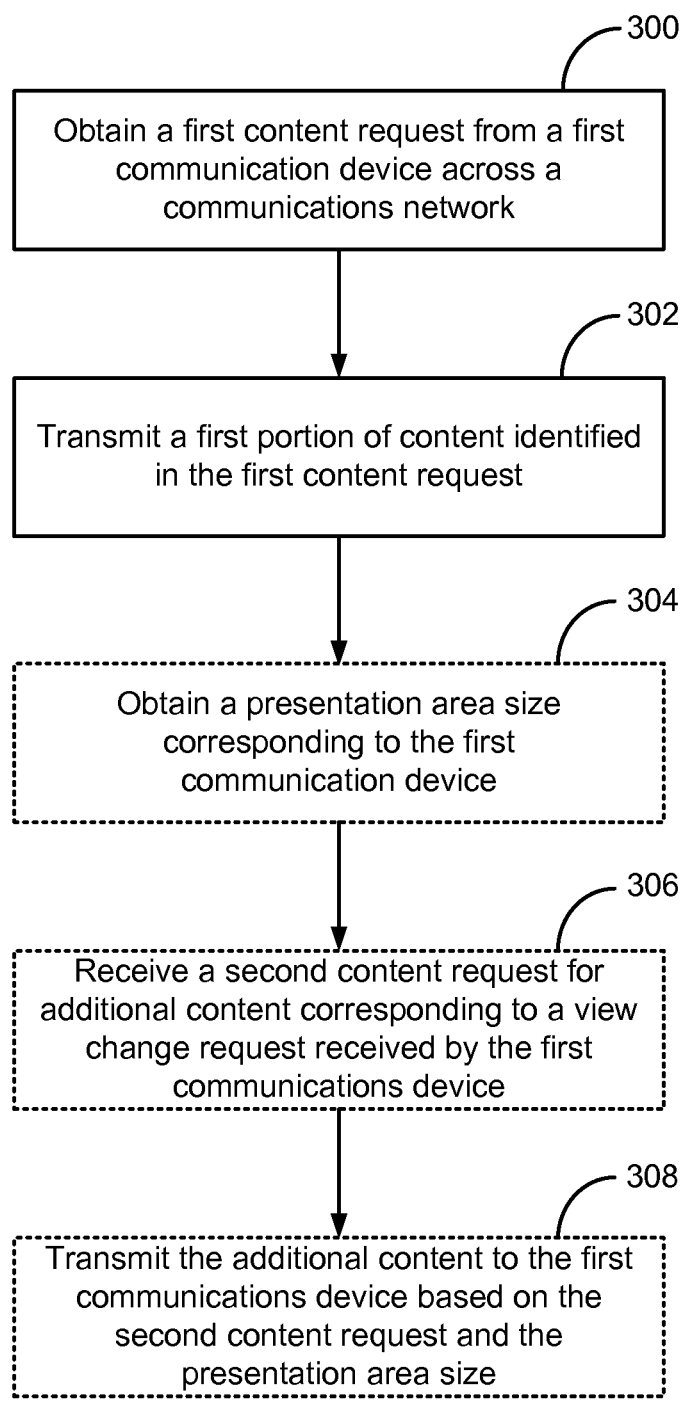
FIG. 8 is a flowchart of one aspect of a method for enhanced presentation operable on a network device downloading content.

Referring to FIG. 8, in operation, one non-limiting case of a method for enhanced content transfer at a network device comprises receiving a first content request from a first communication device across a communications network (Block 300). For example, in one non-limiting aspect, referring to FIG. 1, second communication device 26 receives first content request 44 from first communication device 22 across communications network 28.

Further, the method may include transmitting a first portion of content identified in the first content request (Block 302). For example, in one non-limiting implementation, referring to FIGS. 1 and 6, download manager module 86 may transmit the first portion of content 48 identified in first content request 44 across the communications network 28 to the communication device 22.

Optionally, the method may include obtaining a presentation area size corresponding to the first communication device (Block 304). For example, in one non-limiting aspect, referring to FIG. 1, first communication device 22 may send the presentation area size 34 across the communications network 28 to the second communication device 26. The download manager module 86 may receive the presentation area size 34. Alternatively, once received, second communication device 26 may create a record in memory 60 associating the first communication device 22 with the received presentation area size 34, where the record can be referenced in future requests.

Optionally, the method may include a request for additional content based on an input received by the first communication device (Block 306). For example, in one non-limiting aspect, referring to FIGS. 1 and 6, download manager module 86 may receive second content request 46 from first communication device 22 based on a scroll or change view input received by the first communication device 22.

Optionally, the method may include transmitting additional content to the first communication device based on the second content request and the presentation area size (Block 308). For example, in one non-limiting implementation, referring to FIGS. 1, 2, and 6, the download manager module 86 may transmit a portion of the content 24 based on the second content request 46 and based on the presentation area size 34, which may be received with the request, or which may be already stored in memory. For example, referring to FIG. 2, the additional portion of the content 24 may be "GAME NAME 6" through "GAME NAME 10" for a received scroll down request and for a presentation area size 34 of five lines of 12 characters. The download manager module 86 may calculate the size of the content 24 to transmit based on the presentation area size 34. For example, the presentation area size 34 may be the number of horizontal and vertical pixels for the display 32. In this example, the download manager module 86 may determine how many of the primary data items 52 of the content 24 may be presented on the display 32 based on the number of pixels each primary data item 52 requires to be presented.

Thus, system 20 enhances the presentation of the content on a communication device 22 by retrieving the first portion of content 48 from the second communication device 26 based on the presentation area size 34 of the communication device 22, and alternatively, or in addition, the second portion of content 50 can be retrieved in the background process before the second portion of content 50 is requested for presentation. The presentation of content the 24 may be further enhanced by providing a convenient method of viewing supplemental information 52 associated with primary data items 52.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as at least one or any combination or set of codes or instructions on a machine readable medium and/or a computer readable medium, which may comprise a computer program product.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A communication device, comprising:
   a processor;
   an output device in communication with the processor and having a display with a presentation area size;
   a memory in communication with the processor; and
   a retrieval module stored in the memory and having retrieval logic executable by the processor: to transmit a first content request associated with a list of content items having a first number of content items to a second communication device located across a communications network, the transmitted first content request requesting a first portion of content sized to fit the presentation area size of the display in a single view, and to receive the first portion of content from the second communication device in response to the first content request, wherein the first portion of content is retrieved in a foreground process and comprises a second number of content items from the list of content items that is different from the first number of content items, wherein the second number of content items is determined to concurrently fit into the presentation area size of the display when presented by the display in a list format, and wherein the retrieval logic is further executable by the processor to store the first portion of content in the memory and to generate a second content request to retrieve at least one supplemental data item corresponding to the first portion of content in a background process, wherein the second number of content items comprises an ordered set of a plurality of content items each having a respective weighting factor, and wherein an order of the plurality of content items in the ordered set is based on the respective weighting factors.

2. The communication device of claim 1, further comprising:
   a presentation manager module stored in the memory and having presentation logic executable by the processor to present on the output device a first view of a first set of content sized to fit within the presentation area size, the first set of content being part of the first portion of content.

3. The communication device of claim 2, wherein one of the first set of content is a currently displayed primary data item, and wherein the presentation logic is further executable to generate a supplemental data item view for at least one supplemental data item associated with the currently displayed primary data item, and wherein the presentation logic is further executable to switch to the supplemental data item view upon receiving a supplemental data item request.

4. The communication device of claim 3, wherein the presentation logic is further executable to generate a plurality of supplemental data item views for a plurality of supplemental data items associated with the currently displayed primary data item, and wherein the presentation logic is further operable to switch between the plurality of supplemental data item views upon receiving a plurality of supplemental data item requests.

5. The communication device of claim 1, wherein the content comprises a plurality of primary data items and at least one supplemental data item corresponding to at least one of the plurality of primary data items.

6. The communication device of claim 1, wherein the content comprises a plurality of primary data items and corresponding supplemental data items, wherein the first content request comprises each supplemental data item associated with the first set of content.

7. The communication device of claim 1, wherein the first content request requests only the first set of content.

8. The communication device of claim 1, wherein the content comprises a plurality of primary data items and corresponding supplemental data items, wherein the first content request includes the supplemental data items corresponding to the first set of content, and wherein the first portion of content includes at least one of the plurality of primary data items that is not part of the first set of content.

9. The communication device of claim 1, wherein the retrieval logic is further executable by the processor to retrieve the first portion of content based on the order of the plurality of content items in the ordered set.

10. The communication device of claim 1, wherein the weighting factor is based on a number of application downloads.

11. The communication device of claim 1, wherein the content comprises a plurality of primary data items and corresponding supplemental data items, and wherein at least one supplemental data item comprises video, audio, graphics, animation, or any combination thereof.

12. The communication device of claim 1, wherein the content comprises a plurality of primary data items and corresponding supplemental data items, wherein each of the plurality of primary data items and the corresponding supplemental data items have a data memory size, wherein a sum of the data memory size required to represent each of the plurality of primary data items is substantially smaller than a sum of the data memory size required to represent the supplemental data items.

13. The communication device of claim 1, wherein the content comprises a hierarchy having a plurality of levels, wherein the plurality of levels comprise at least a first level having a primary data item and a second level having a supplemental data item corresponding to the primary data item.

14. The communication device of claim 13, wherein the retrieval logic is further operable to generate the second content request to retrieve a second portion of content corresponding to the first portion of content, wherein the first portion of content comprises the primary data item, and wherein the second portion of content comprises corresponding supplemental data items.

15. The communication device of claim 1, wherein the retrieval logic is further executable by the processor to transmit the presentation area size to the second communication device, and wherein the communication device is further operable to receive a second portion of content having a second received amount of data sized based on the presentation area size.

16. The communication device of claim 1, wherein the retrieval logic is further executable by the processor to remove from memory at least part of the first portion of content based on a deletion order.

17. The communication device of claim 1, further comprising:
a monitoring module stored in the memory and having monitoring logic executable by the processor to store actions of the communication device in an action history, wherein the actions relate to the first portion of content, and wherein the monitoring logic is further executable to transmit the action history to another device for analysis.

18. The communication device of claim 1, wherein the weighting factor is based on a frequency of screen view.

19. The communication device of claim 1, wherein the weighting factor is based on a device user preference.

20. The communication device of claim 1, wherein the weighting factor is based on a content provider preference.

21. The communication device of claim 1, wherein the weighting factor is based on a pay-for-placement scheme.

22. The communication device of claim 1, wherein the weighting factor is based on a quality rating.

23. The communication device of claim 1, wherein the weighting factor is based on a profit margin or cost.

24. The communication device of claim 1, wherein the retrieval logic is further executable by the processor to transfer the presentation area size to the second communication device and receive the requested first portion of content from the second communication device based on the transferred presentation area size.

25. A method for retrieving content on a communication device, comprising:
obtaining a presentation area size of a display on a first communication device;
transmitting a first content request associated with a list of content items having a first number of content items to a second communication device located across a communications network, the transmitted first content request requesting a first portion of content sized to fit the presentation area size of the display in a single view;
receiving the first portion of content from the second communication device in response to the first content request, wherein the first portion of content is retrieved in a foreground process and comprises a second number of content items from the list of content items that is different from the first number of content items, wherein the second number of content items is determined to concurrently fit into the presentation area size of the display when presented by the display in a list format, wherein the second number of content items comprises an ordered set of a plurality of content items each having a respective weighting factor, and wherein an order of the plurality of content items in the ordered set is based on the respective weighting factors;
storing the first portion of content in a memory of the first communication device; and
generating a second content request to retrieve at least one supplemental data item corresponding to the first portion of content in a background process.

26. The method of claim 25, wherein obtaining the first portion of content comprises obtaining content sized to fit within the presentation area size.

27. The method of claim 25, wherein the content comprises a plurality of primary data items and at least one supplemental data item corresponding to at least one of the plurality of primary data items, the method further comprising:
retrieving at least part of the plurality of primary data items in the foreground process; and retrieving the at least one supplemental data item corresponding to the at least part of the plurality of primary data items in the background process.

28. The method of claim 25, wherein the content comprises a plurality of primary data items and at least one supplemental data item corresponding to at least one of the plurality of primary data items, wherein the first portion of content comprises at least part of the plurality of data items and the at least one supplemental data item corresponding to at least the part of the plurality of primary data items, and wherein the method further comprises:
retrieving, in the background process, any remaining part of the plurality of primary data items and any remaining part of the at least one supplemental data items.

29. The method of claim 25, wherein the content comprises a plurality of primary data items and at least one supplemental data item corresponding to at least one of the plurality of primary data items, and the method further comprising:
presenting a first view of a first set of the first portion of content on the display, wherein the first set comprises at least a part of the plurality of primary data items.

30. The method of claim 29, further comprising:
generating a supplemental data item view for the at least one supplemental data item corresponding to a currently displayed primary data item; and
switching to the supplemental data item view, in response to receiving a supplemental data item request.

31. The method of claim 25, wherein receiving the first portion of content further comprises retrieving the first portion of content based on the order of the plurality of content items in the ordered set.

32. The method of claim 25, wherein the weighting factor is based on at least one of a number of application downloads, a frequency of screen view, a device user preference, a content provider preference, a pay-for-placement scheme, a quality rating, a profit margin, a cost, or any combination thereof.

33. The method of claim 25, wherein the content comprises a plurality of primary data items and corresponding supplemental data items, wherein each of the plurality of primary data items and the corresponding supplemental data items have a data memory size, wherein a sum of the data memory size required to represent each of the plurality of primary data items is substantially smaller than a sum of the data memory size required to represent the supplemental data items, and wherein obtaining the first portion of content comprises obtaining at least part of the plurality of primary data items.

34. The method of claim 25, wherein the content comprises a hierarchy having a plurality of levels, wherein the plurality of levels comprise at least a first level having a primary data item and a second level having a supplemental data item corresponding to the primary data item, and wherein obtaining the first portion of content comprises obtaining at least the first level of the hierarchy.

35. The method of claim 25, wherein obtaining the first portion of content further comprises:
generating the first content request comprising the presentation area size; and
generating the second content request to retrieve a second portion of content corresponding to the first portion of content,
wherein the first portion of content comprises a primary data item, and wherein the second portion of content comprises a supplemental data item corresponding to the primary data item.

36. The method of claim 25, further comprising removing from memory at least part of the first portion of content based on a deletion order.

37. The method of claim 25, further comprising storing actions occurring on the first communication device in an action history in the memory, wherein the actions relate to the first portion of content.

38. At least one processor for retrieving content on a communication device, comprising:
a first hardware module for obtaining a presentation area size of a display on a first communication device;
a second module for transmitting a first content request associated with a list of content items having a first number of content items to a second communication device located across a communications network, the transmitted first content request requesting a first portion of content sized to fit the presentation area size of the display in a single view;
a third module for receiving the first portion of content from the second communication device in response to the first content request, wherein the first portion of content is retrieved in a foreground process and comprises a second number of content items from the list of content items that is different from the first number of content items, wherein the second number of content items is determined to concurrently fit into the presentation area size of the display when presented by the display in a list format, wherein the second number of content items comprises an ordered set of a plurality of content items each having a respective weighting factor, and wherein an order of the plurality of content items in the ordered set is based on the respective weighting factors;
a fourth module for storing the first portion of content in a memory of the first communication device; and
a fifth module for generating a second content request to retrieve at least one supplemental data item corresponding to the first portion of content in a background process.

39. A computer program product, comprising:
a non-transitory computer-readable medium comprising:
at least one instruction for causing a computer to obtain a presentation area size of a display on a first communication device;
at least one instruction for causing the computer to transmit a first content request associated with a list of content items having a first number of content items to a second communication device located across a communications network, the transmitted first content request requesting a first portion of content sized to fit the presentation area size of the display in a single view;
at least one instruction for causing the computer to receive the first portion of content from the second communication device in response to the first content request, wherein the first portion of content is retrieved in a foreground process and comprises a second number of content items from the list of content items that is different from the first number of content items, wherein the second number of content items is determined to concurrently fit into the presentation area size of the display when presented by the display in a list format, wherein the second number of content items comprises an ordered set of a plurality of content items each having a respective weighting factor, and wherein an order of the plurality of content items in the ordered set is based on the respective weighting factors;

at least one instruction for causing the computer to store the first portion of content in a memory of the first communication device at least one instruction for causing the computer to generate a second content request to retrieve at least one supplemental data item corresponding to the first portion of content in a background process.

40. An apparatus, comprising:

means for obtaining a presentation area size of a display on a first communication device;

means for transmitting a first content request associated with a list of content items having a first number of content items to a second communication device located across a communications network, the transmitted first content request requesting a first portion of content sized to fit the presentation area size of the display in a single view;

means for receiving the first portion of content from the second communication device in response to the first content request, wherein the first portion of content is retrieved in a foreground process and comprises a second number of content items from the list of content items that is different from the first number of content items, wherein the second number of content items is determined to concurrently fit into the presentation area size of the display when presented by the display in a list format, wherein the second number of content items comprises an ordered set of a plurality of content items each having a respective weighting factor, and wherein an order of the plurality of content items in the ordered set is based on the respective weighting factors;

means for storing the first portion of content in a memory of the first communication device; and means for generating a second content request to retrieve at least one supplemental data item corresponding to the first portion of content in a background process.

41. A network device, comprising:

a processor;

a memory in communication with the processor, the memory comprising content; and a download manager module stored in the memory and having download manager logic executable by the processor to receive a first content request associated with a list of content items having a first number of content items from a communication device having a presentation area size, the received first content request requesting a first portion of content sized to fit the presentation area size of the communication device in a single view, and wherein the download manager logic is further executable by the processor to transmit the first portion of content to a foreground process executing on the communication device in response to the first content request and to receive a second content request to retrieve at least one supplemental data item corresponding to the first portion of content from a background process executing on the communication device, wherein the transmitted first portion of content comprises a second number of content items from the list of content items that is different from the first number of content items, wherein the second number of content items is determined to concurrently fit into the presentation area size of the communication device when presented by the communication device in a list format, wherein the second number of content items comprises an ordered set of a plurality of content items each having a respective weighting factor, and wherein an order of the plurality of content items in the ordered set is based on the respective weighting factors.

42. The network device of claim 41, wherein the first portion of content comprises a part of the content sized to fit within the presentation area size.

43. The network device of claim 41, wherein the content comprises a plurality of primary data items and at least one supplemental data item corresponding to at least one of the plurality of primary data items, and wherein the download manager module is further operable to transmit at least part of the plurality of primary data items to the foreground process executing on the communication device, and transmit the at least one supplemental data item corresponding to the at least part of the plurality of primary data items to the background process executing on the communication device.

44. The network device of claim 41, wherein the content comprises a plurality of primary data items and at least one supplemental data item corresponding to at least one of the plurality of primary data items, wherein the first portion of content comprises at least part of the plurality of primary data items and the at least one supplemental data item corresponding to at least the part of the plurality of primary data items, and wherein the download manager module is further operable to transmit to the background process executing on the communication device any remaining part of the plurality of primary data items and any remaining part of the at least one supplemental data items.

45. The network device of claim 41, wherein the download logic is further executable to transmit the first portion of content based on the order of the plurality of content items in the ordered set.

46. The network device of claim 41, wherein the weighting factor is based on at least one of a number of application downloads, a frequency of screen view, a device user preference, a content provider preference, a pay-for-placement scheme, a quality rating, a profit margin, a cost, or any combination thereof.

47. The network device of claim 41, wherein the content comprises a plurality of primary data items and corresponding supplemental data items, wherein each of the plurality of primary data items and the corresponding supplemental data items have a data memory size, wherein a sum of the data memory size required to represent each of the plurality of primary data items is substantially smaller than a sum of the data memory size required to represent the supplemental data items, and wherein the first portion of content comprises at least part of the plurality of primary data items.

48. The network device of claim 41, wherein the content comprises a hierarchy having a plurality of levels, the plurality of levels comprising at least a first level having a primary data item and a second level having a supplemental data item corresponding to the primary data item, and wherein the first portion of content comprises at least the first level of the hierarchy.

49. The network device of claim 41, wherein the content comprises a plurality of primary data items and corresponding supplemental data items, wherein the download manager module is further operable to receive the second content request to retrieve a second portion of the content corresponding to the first portion of content, the first portion of content comprising at least one of the plurality of primary data items, and the second portion of content comprising the at least one supplemental data item corresponding to the at least one primary data item.

50. The network device of claim 41, wherein the memory further comprises an action history received from the communication device, and wherein the action history comprises actions occurring on the communication device relating to the first portion of the content.

51. The network device of claim 41, wherein the download logic is further executable to receive the presentation area size from the communication device, determine the second number of content items based on the received presentation area size, and create a record in the memory associating the communication device with the received presentation area size.

52. A method of delivering content to a communication device, comprising:
receiving, at a computer device, a first content request associated with a list of content items having a first number of content items from the communication device having a presentation area size and located across a communications network, the received first content request requesting a first portion of content sized to fit the presentation area size of the communication device in a single view;
transmitting, to a foreground process executing on the communication device, the requested first portion of content in response to the first content request, wherein the transmitted first portion of content comprises a second number of content items from the list of content items that is different from the first number of content items, wherein the second number of content items is determined to concurrently fit into the presentation area size of the communication device when presented by the communication device in a list format, wherein the second number of content items comprises an ordered set of a plurality of content items each having a respective weighting factor, and wherein an order of the plurality of content items in the ordered set is based on the respective weighting factors; and
receiving, at the computer device, a second content request to retrieve at least one supplemental data item corresponding to the first portion of content from a background process executing on the communication device.

53. The method of claim 52, wherein transmitting the first portion of content comprises transmitting a part of the content sized to fit within the presentation area size.

54. The method of claim 52, wherein the content comprises a plurality of primary data items and at least one supplemental data item corresponding to at least one of the plurality of primary data items, and wherein at least part of the plurality of primary data items is transmitted to the foreground process executing on the communication device, and the at least one supplemental data item corresponding to the at least part of the plurality of primary data items is transmitted to the background process executing on the communication device.

55. The method of claim 52, wherein the content comprises a plurality of primary data items and at least one supplemental data item corresponding to at least one of the plurality of primary data items, wherein the first portion of content comprises at least part of the plurality of primary data items and the at least one supplemental data item corresponding to at least the part of the plurality of primary data items, and wherein the method further comprises:
transmitting, to the background process executing on the communication device, any remaining part of the plurality of primary data items and any remaining part of the at least one supplemental data items.

56. The method of claim 52, wherein transmitting the first portion of content is based on the order of the plurality of content items in the ordered set.

57. The method of claim 52, wherein the weighting factor is based on at least one of a number of application downloads, a frequency of screen view, a device user preference, a content provider preference, a pay-for-placement scheme, a quality rating, a profit margin, a cost, or any combination thereof.

58. The method of claim 52, wherein the content comprises a plurality of primary data items and corresponding supplemental data items, wherein each of the plurality of primary data items and the corresponding supplemental data items have a data memory size, wherein a sum of the data memory size required to represent each of the plurality of primary data items is substantially smaller than a sum of the data memory size required to represent the supplemental data items, and wherein transmitting the first portion of the content comprises transmitting at least part of the plurality of primary data items.

59. The method of claim 52, wherein the content comprises a hierarchy having a plurality of levels, the plurality of levels comprising at least a first level having a primary data item and a second level having a supplemental data item corresponding to the primary data item, and wherein transmitting the first portion of the content comprises transmitting at least the first level of the hierarchy.

60. The method of claim 52, wherein the content comprises a plurality of primary data items and corresponding supplemental data items, the method further comprising:
receiving the second content request to retrieve a second portion of the content corresponding to the first portion of the content, wherein the first portion of content comprises at least one of the plurality of primary data items, and the second portion of content comprises the at least one supplemental data item corresponding to the at least one primary data item.

61. The method of claim 52, further comprising storing, in a memory, an action history received from the communication device, wherein the action history comprises actions occurring on the communication device relating to the first portion of the content.

62. At least one processor configured to deliver content to a communication device, comprising:
a first hardware module for receiving a first content request associated with a list of content items having a first number of content items from the communication device having a presentation area size and located across a communications network, the received first content request requesting a first portion of content sized to fit the presentation area size of the communication device in a single view;
a second module for transmitting, to a foreground process executing on the communication device, the requested first portion of content in response to the first content request, wherein the transmitted first portion of content comprises a second number of content items from the list of content items that is different from the first number of content items, wherein the second number of content items is determined to concurrently fit into the presentation area size of the communication device when presented by the communication device in a list format, wherein the second number of content items comprises an ordered set of a plurality of content items each having a respective weighting factor, and wherein an order of the plurality of content items in the ordered set is based on the respective weighting factors; and
a third module for receiving a second content request to retrieve at least one supplemental data item corresponding to the first portion of content from a background process executing on the communication device.

63. A computer program product, comprising:
a non-transitory computer-readable medium comprising:

at least one instruction for causing a computer to receive a first content request associated with a list of content items having a first number of content items from a communication device having a presentation area size and located across a communications network, the received first content request requesting a first portion of content sized to fit the presentation area size of the communication device in a single view;

at least one instruction for causing the computer to transmit, to a foreground process executing on the communication device, the requested first portion of content in response to the first content request, wherein the transmitted first portion of content comprises a second number of content items from the list of content items that is different from the first number of content items, wherein the second number of content items is determined to concurrently fit into the presentation area size of the communication device when presented by the communication device in a list format, wherein the second number of content items comprises an ordered set of a plurality of content items each having a respective weighting factor, and wherein an order of the plurality of content items in the ordered set is based on the respective weighting factors; and at least one instruction for causing the computer to receive a second content request to retrieve at least one supplemental data item corresponding to the first portion of content from a background process executing on the communication device.

64. An apparatus, comprising:

means for receiving a first content request associated with a list of content items having a first number of content items from a communication device having a presentation area size and located across a communications network, the received first content request requesting a first portion of content sized to fit the presentation area size of the communication device in a single view;

means for transmitting, to a foreground process executing on the communication device, the requested first portion of content in response to the first content request, wherein the transmitted first portion of content comprises a second number of content items from the list of content items that is different from the first number of content items, wherein the second number of content items is determined to concurrently fit into the presentation area size of the communication device when presented by the communication device in a list format, wherein the second number of content items comprises an ordered set of a plurality of data items each having a respective weighting factor, and wherein an order of the plurality of content items in the ordered set is based on the respective weighting factors; and means for receiving a second content request to retrieve at least one supplemental data item corresponding to the first portion of content from a background process executing on the communication device.

65. A method for retrieving content on a client device, comprising:

obtaining a presentation area size of a display associated with the client device;

determining a number of content items from a list of content items that can concurrently fit into the presentation area size of the display;

configuring a first content request to request a first set of content items from the list of content items, wherein a given number of content items in the first set of content items is based on the determined number;

transmitting the first content request in a foreground process, the transmitted first content request requesting the first set of content items sized to fit the presentation area size of the display in a single view;

receiving, in the foreground process, the first set of content items in response to the first content request;

presenting the first set of content items on the display; and generating a second content request to retrieve at least one supplemental data item corresponding to at least one of the first set of content items in a background process.

66. The method of claim 65, further comprising:

configuring the second content request to request a second set of content items from the list of content items that were not part of the first set of content items;

transmitting the second content request in the background process; and receiving, in the background process, the second set of content items in response to the second content request.

67. The method of claim 65, wherein the determined number is the number of content items from the list of content items that can concurrently fit into the presentation area size of the display when presented in a list format.

68. A method for provisioning content from a server device to a client device, comprising:

receiving a first content request from a foreground process executing on the client device, wherein the first content request requests a first set of content items from a list of content items sized to fit a presentation area size of a display associated with the client device in a single view, wherein a given number of content items in the first set of content items is based upon a number of content items determined to concurrently fit into the presentation area size of the display associated with the client device;

transmitting the first set of content items to the foreground process executing on the client device in response to the first content request; and receiving a second content request to retrieve at least one supplemental data item corresponding to at least one of the first set of content items from a background process executing on the client device.

69. The method of claim 68, further comprising:

transmitting a second set of content items to the background process executing on the client device in response to the second content request, wherein the second content request requests the second set of content items from the list of content items that were not part of the first set of content items.

70. The method of claim 68, wherein the determined number is the number of content items from the list of content items that can concurrently fit into the presentation area size of the display when presented in a list format.

* * * * *